United States Patent [19]
Dirck

[11] Patent Number: 5,823,097
[45] Date of Patent: Oct. 20, 1998

[54] DEVICE FOR STORING AND TRANSFERRING WASTE COOKING OIL

[76] Inventor: Ronald L. Dirck, 152 S. Zimmer Rd., Warsaw, Ind. 46580

[21] Appl. No.: 872,420

[22] Filed: Jun. 10, 1997

[51] Int. Cl.⁶ .................................................. A47J 37/12
[52] U.S. Cl. ................................ 99/408; 99/342; 99/403; 137/341; 137/558; 210/167; 210/DIG. 8
[58] Field of Search .............................. 99/330, 403, 407, 99/408, 516, 342, 486, 487; 126/391, 351, 374, 380; 137/360, 558, 356, 358, 341, 563; 141/1, 82, 95, 98, 231; 210/167, DIG. 8, 461, 486, 489; 219/506, 492, 494; 392/441, 444; 426/438, 231, 417

[56] References Cited

U.S. PATENT DOCUMENTS

| | | | |
|---|---|---|---|
| 4,050,447 | 9/1977 | Terracciano | 99/330 X |
| 4,135,079 | 1/1979 | McGraw | 137/558 X |
| 4,210,123 | 7/1980 | Moore et al. | 137/563 X |
| 4,282,094 | 8/1981 | Mitchell | 210/167 X |
| 4,485,831 | 12/1984 | Ungerleider | 137/341 X |
| 4,599,990 | 7/1986 | Fritzsche et al. | 99/403 X |
| 4,622,135 | 11/1986 | Williams | 137/341 X |
| 4,646,793 | 3/1987 | Sherratt | 99/403 |
| 5,179,891 | 1/1993 | Chiu | 99/408 |
| 5,249,511 | 10/1993 | Shumate et al. | 99/408 |
| 5,312,921 | 5/1994 | Davis | 99/330 |
| 5,609,193 | 3/1997 | Steckler | 141/82 X |
| 5,629,039 | 5/1997 | Brintle | 426/417 |

*Primary Examiner*—Timothy F. Simone
*Attorney, Agent, or Firm*—Baker & Daniels

[57] ABSTRACT

An apparatus for collecting, storing, and transferring waste cooking oil from commercial fryers. The present device includes a holding tank having a sloped bottom wall, an input conduit for connection to a supply of waste grease or oil, and an output conduit for transferring the oil to a disposal facility. The holding tank includes a pump having an internal grinder for pulverizing solids such as chicken parts or french fries, and the pump is operated by a drive motor having limiting timer which prevents the motor and/or pump from being destroyed if inadvertently left on. A system of float switches mounted within the holding tank monitor the level of waste oil in the chamber, and trigger an internal heating element which prevents the oil form solidifying. The float switches also activate external warning lights which alert the operator when the tank is ar or near capacity, and also interrupt the pump operation to prevent overfill. The tank is used in conjunction with a collection cart having an extended collection tray which allows the tray to extend under the drain system of a commercial fryer to facilitate safe and effective removal of the waste oil.

24 Claims, 6 Drawing Sheets

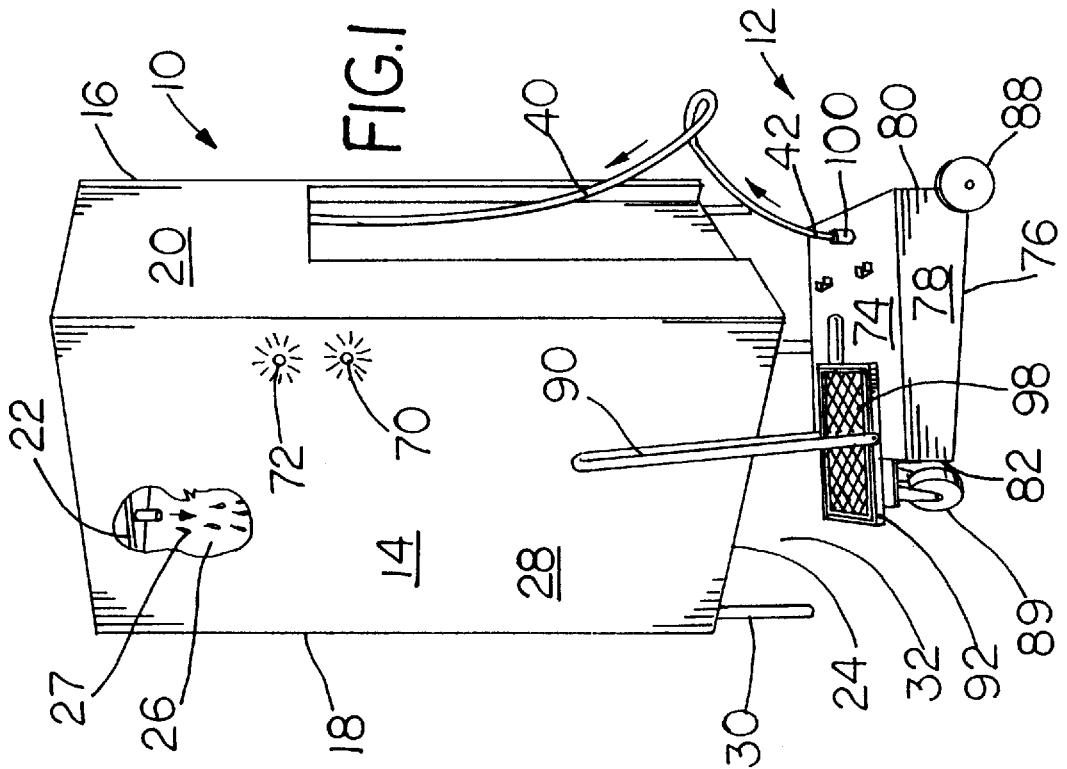
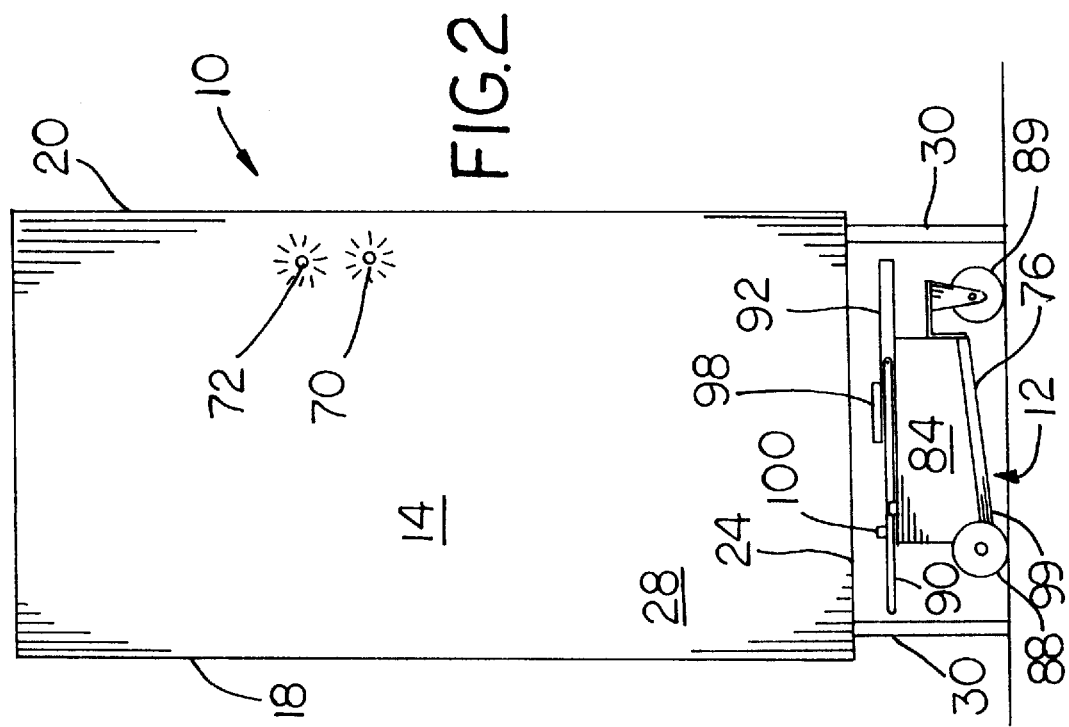

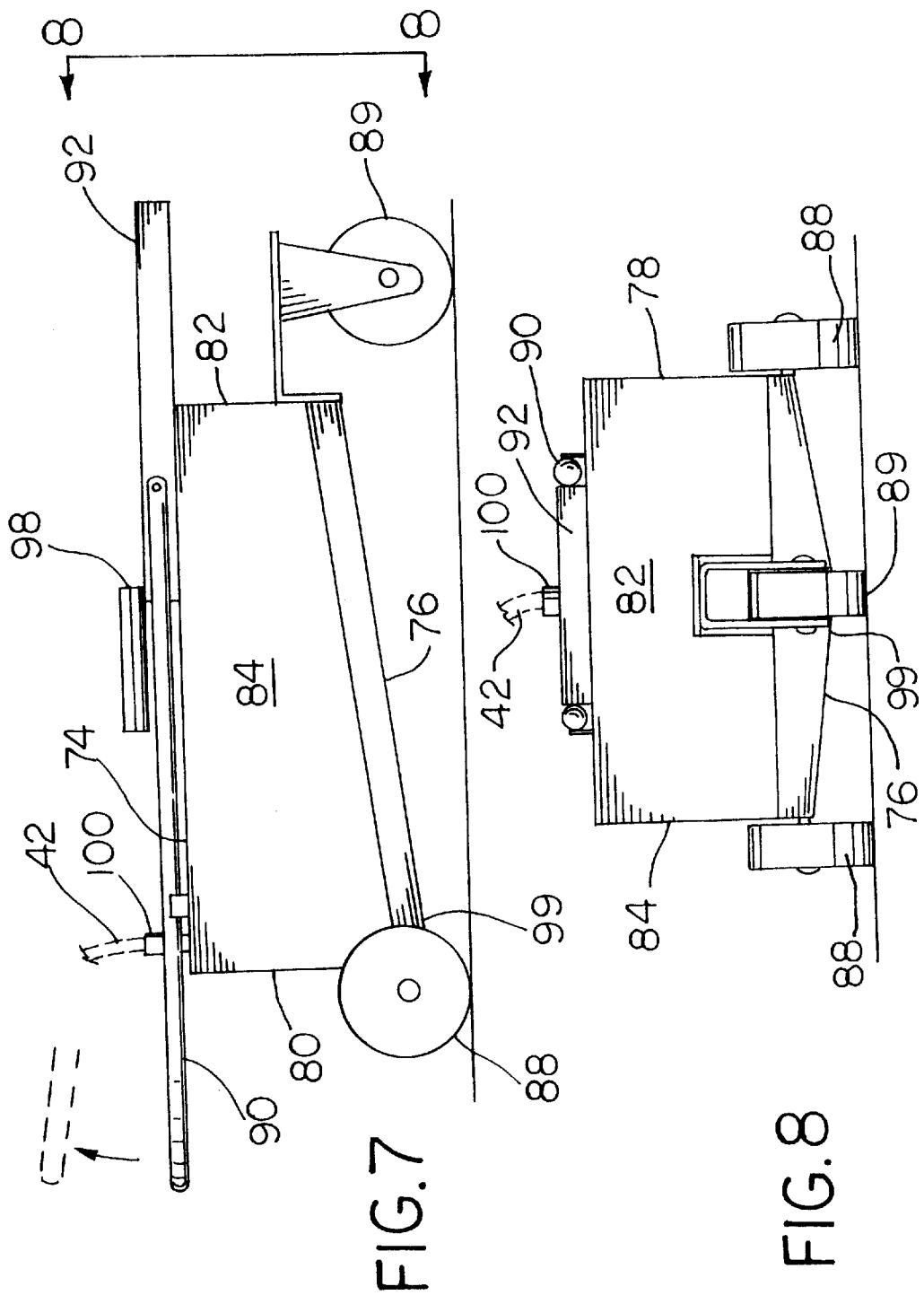

DEVICE FOR STORING AND TRANSFERRING WASTE COOKING OIL

This invention relates to a container for storing, transferring and transporting waste cooking oil that has been used in commercial fryers.

BACKGROUND OF THE INVENTION

Most restaurants, especially fast food restaurants, have one or more commercial deep frying units which are used to cook french fries, chicken, fish or other food items by submersing the food items in hot oil. The oil used to cook the food products has a limited shelf life, as it becomes contaminated by bits and pieces of food as well as water and fats released from the food during the cooking process. Accordingly, the waste oil, commonly referred to as grease, needs to be changed on a regular basis.

The present invention provides a waste cooking oil storage tank having an input pump, a heating element, and a set of indicator lights which tell the operator when the level of the waste oil in the tank is at or near capacity. The present holding tank also includes an electronic switching element which automatically turns on the heating element, and which automatically activates the indicator lights when the oil within the tank has reached one or more predetermined levels. A suction pump having an internal timer draws the waste oil from the waste oil source into the holding tank. The timer can be preset, and accordingly the pump will only run for a predetermined period of time, which prevents the pump or drive motor from burning out if the operator inadvertently leaves the unit on. The switch that activates the indicator lights also includes an automatic shutoff, which prevents the holding tank from being overfilled. The holding tank preferably has a polished stainless steel exterior skin, and includes insulated walls to prevent workers from being burned.

The present invention also incorporates a wheeled collection cart which is used to collect waste oil from commercial fryers. The collection cart having the liquid cooking oil stored therein is wheeled from the fryer to a position adjacent the holding tank, where the oil can be transferred from the cart into the holding tank using the aforementioned suction pump. The collection cart includes a removable catch tray, which minimizes the amount of solids and particulate matter transferred into the cart and ultimately into the holding tank. The collection cart includes an extended portion, which extends under the drain system of the commercial fryers and thus makes the cooking oil collection process safer and easier.

Accordingly, it is an object of this invention to provide an improved waste cooking oil holding tank.

It is another object of this invention to provide an improved waste cooking oil holding tank for use in conjunction with an improved waste cooking oil collection cart.

A further object of this invention is to provide a waste cooking oil holding tank having an internal heating element and automatic overfill protection.

These and other objects of the invention will become readily apparent to those skilled in the art upon a reading of the following description.

BRIEF DESCRIPTION OF THE DRAWINGS

FIG. 1 is a perspective view of the cooking oil holding tank and collection cart according to the present invention shown with the input conduit inserted in the collection cart for transferring waste cooking oil to the holding tank;

FIG. 2 is an elevational view of the holding tank and collection cart of figure one shown with the collection cart stored beneath the holding tank;

FIG. 7 is an elevational view of the collection cart shown in FIGS. 5 and 6 illustrating the sloped bottom; and FIG. 8 is an elevational view taken along lines 8—8 of FIG. 7 illustrating the sloped bottom wall of the collection cart.

DETAILED DESCRIPTION OF THE INVENTION

Figure 3:
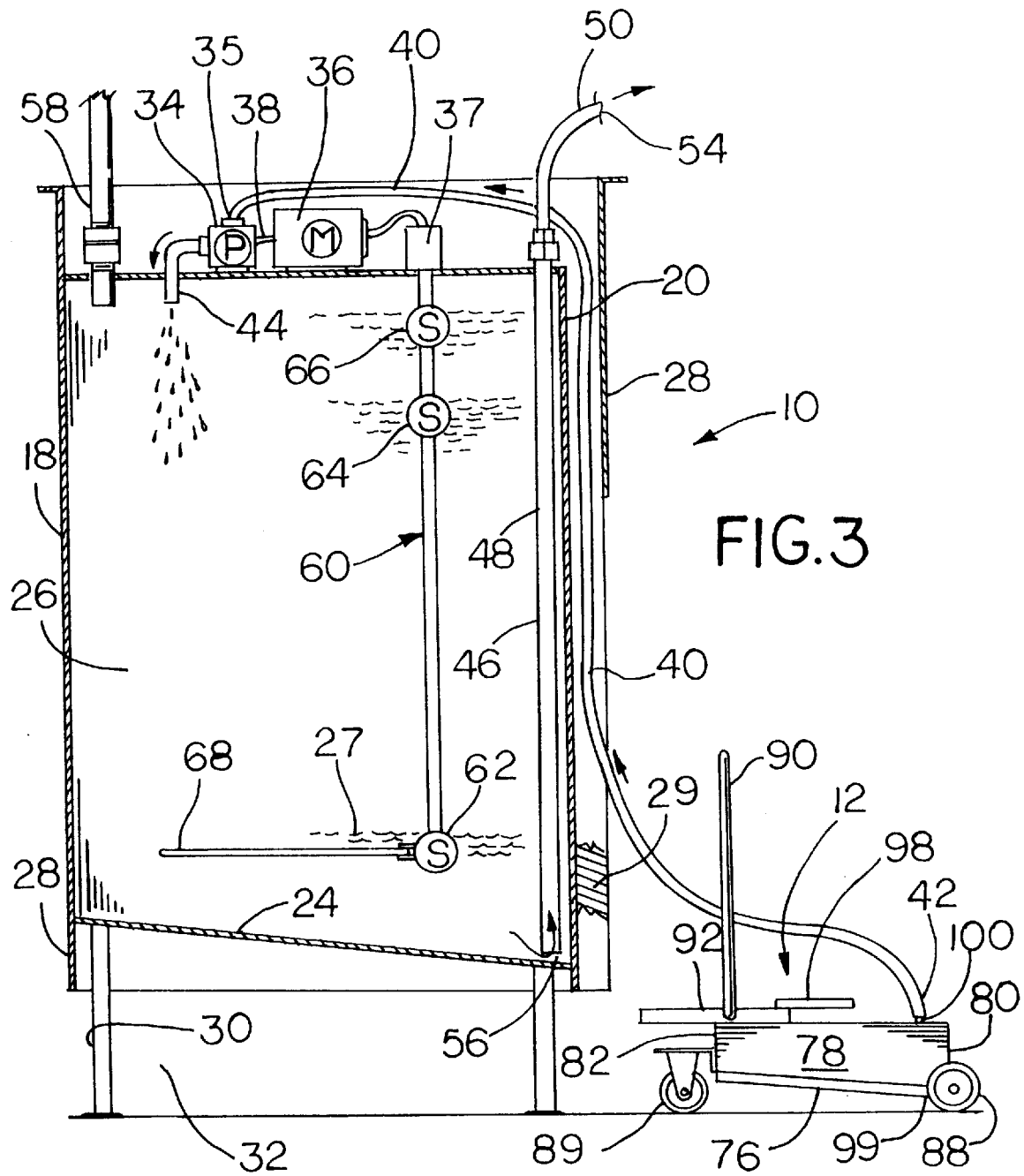
FIG. 3 is a cross sectional view of the holding tank and collection cart of FIGS. 1 and 2 illustrating the input and output conduits, the heating element and the level sensors.

The embodiment herein described is not intended to be exhaustive or to limit the invention to the precise form disclosed. It has been chosen and described in order to explain the principals of the invention and its application in practical use to enable others skilled in the art to follow its teachings.

Referring now to the drawings, a waste grease or cooking oil holding tank incorporating the features of the present invention is generally referred to by the reference numeral 10 is shown in conjunction with a collection cart 12. Holding tank 10 includes a front wall 14, a rear wall 16, and a pair of interconnecting side walls 18, 20. Tank 18 also includes a top wall 22 and a bottom wall 24. Side walls 14, 16, 18 and 20 together with top wall 22 and bottom wall 24 cooperate to define an oil holding chamber 26 for storing a quantity of liquid oil 27 or other liquid material. Each of the aforementioned walls are preferably constructed of steel as is commonly employed in the art, and each of walls 14, 16, 18 and 20 preferably includes an exterior skin 28. Exterior skin 28 is preferably constructed of polished stainless steel which presents an attractive and easy-to-clean surface as is commonly employed in the restaurant industry. A quantity of insulation 29 is disposed under skin 28 as desired. Tank 10 also includes a plurality of legs 30 thus providing a storage area 32 between bottom wall 24 and the ground or support surface.

Referring now to FIG. 3, a suction pump 34 having a drive motor 36 operatively attached thereto by a drive shaft 38 is attached to the top wall 22 of tank 10. Motor 36 is controlled by a timer 37, which limits the duration of time the motor 36 will operate during any given cycle, which thus prevents the motor and or pump from being inadvertently left on. Pump 34 includes an internal grinder 35 which pulverizes any solids such as french fries or chicken parts contained in the oil 27. An input conduit 40 includes a suction end 42 for connection to the collection cart 12 as will be explained in greater detail below. Conduit 40 also includes discharge end 44 which is disposed within the interior 26 of tank 10 for transferring oil 27 from the input end 42 through the discharge end 44 and into chamber 26. Pump 34 is installed in conduit 40 adjacent end 44 so that the pump 34 operates primarily to suction cooking oil from collection cart 12 and discharge the cooking oil into chamber 26. Cooking oil is removed from chamber 26 through discharge conduit 46, which includes a rigid portion 48 and a flexible portion 50. Rigid portion 48 includes a suction end 52 and a discharge end 54 for drawing liquid oil 27 out of tank 10 using a discharge pump (not shown) as is commonly employed on the art. Bottom wall 24 of tank 10 is preferably sloped to create a depression or pickup point 56, and end 52 of conduit 46 is disposed immediately adjacent the pickup point 56. A vent stack 58 is attached to upper wall 22, which vents air into or out of the chamber 26 of tank 10 as the level of liquid oil 27 rises or falls within the tank 10.

An electronic switching unit 60 is disposed within chamber 26 of tank 10. Switch unit 60 includes three float switches 62, 64 and 66. Each float switch 62, 64 and 66 includes a microswitch which produces an output signal in response to changes in the amount of liquid oil 27 in the tank 10. A heating element 68 is electrically connected to float switch 62, and accordingly when the level of oil 27 in the tank rises past float 62 the heating element 68 is activated in order to keep the oil 27 in the tank 10 in a liquid state. Preferably, float 62 is located so that it is triggered when the level of oil 27 in tank 10 reaches approximately 25% of capacity. Heating element 68 is preferably an electrical resistance heater as is commonly available in the art. Float switches 64, 66 are electrically connected to a pair of indicator lights 70, 72 respectively, as can be seen in FIGS. 1 and 2. Float switch 66 is also electrically connected to drive motor 36. Upon activation of float switches 64, 66 due to rising oil 27 within the tank 10, indicator light 70 indicates that the level of the oil 27 within tank 10 is nearing capacity. Similarly, upon activation of float switch 66 indicator light 72 indicates that the level of oil 27 within tank 10 has reached capacity. Float switch 66 is also electrically connected to motor 36, and when the level of oil 27 within tank 10 reaches capacity float switch 66 automatically shuts off drive motor 36 so that no more waste oil is pulled into tank 10 by pump 34.

Figure 4:
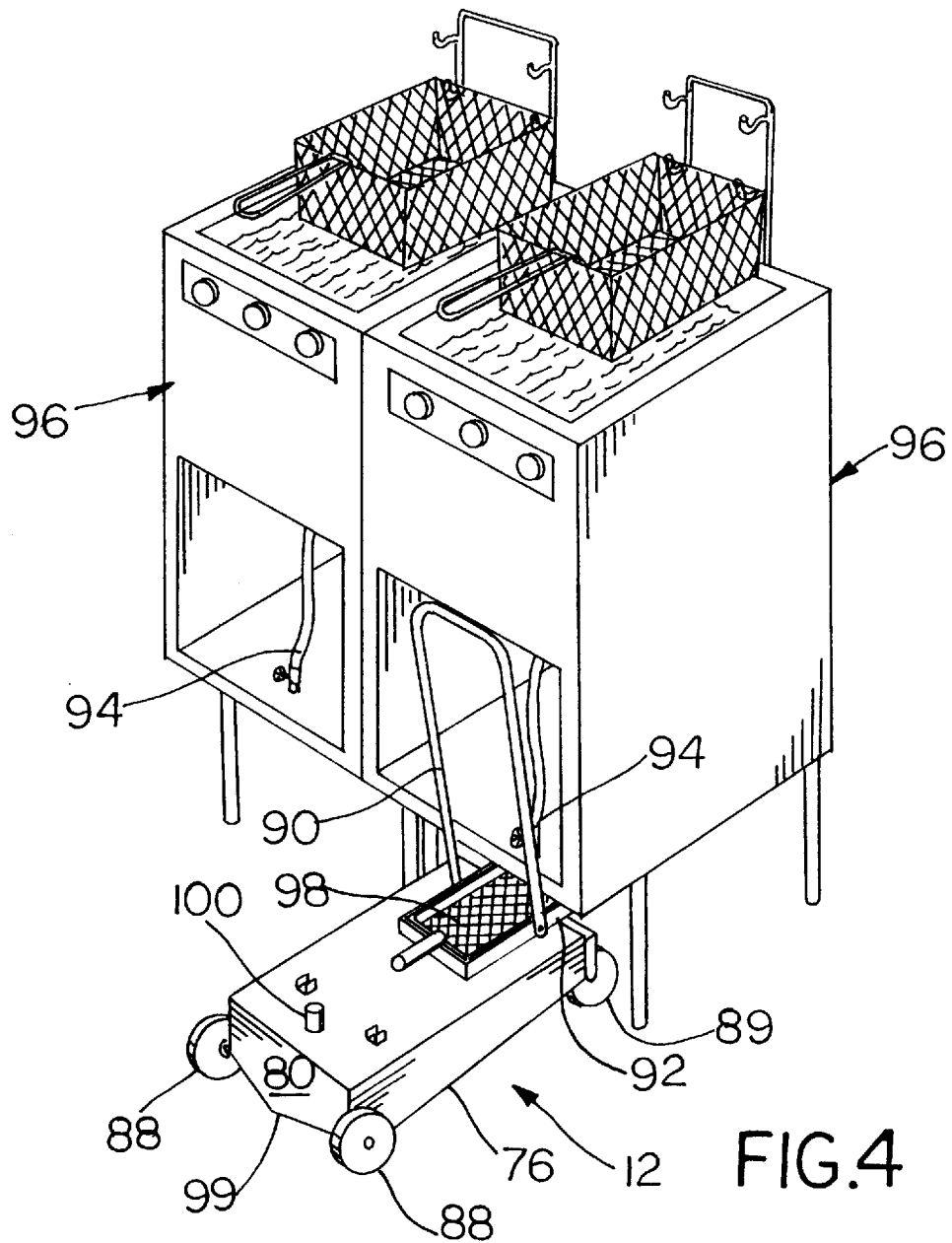
FIG. 4 is a perspective view of the collection cart shown in FIGS. 1–3 showing the extended snout with the catch tray attached thereto positioned under the drain line of a commercial fire.
Figure 5:
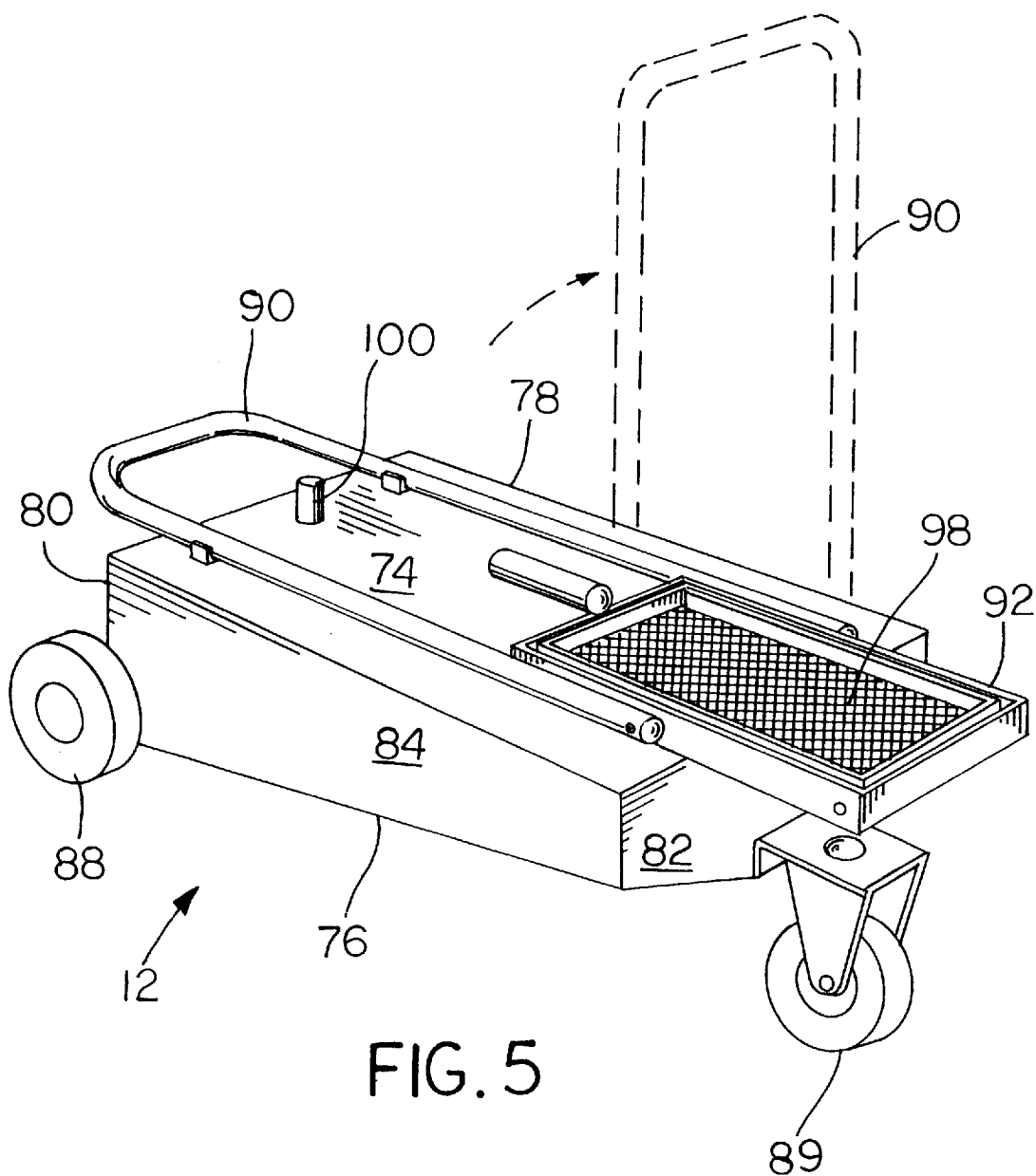
FIG. 5 is a perspective view of the present collection cart illustrating the folding handle.
Figure 6:
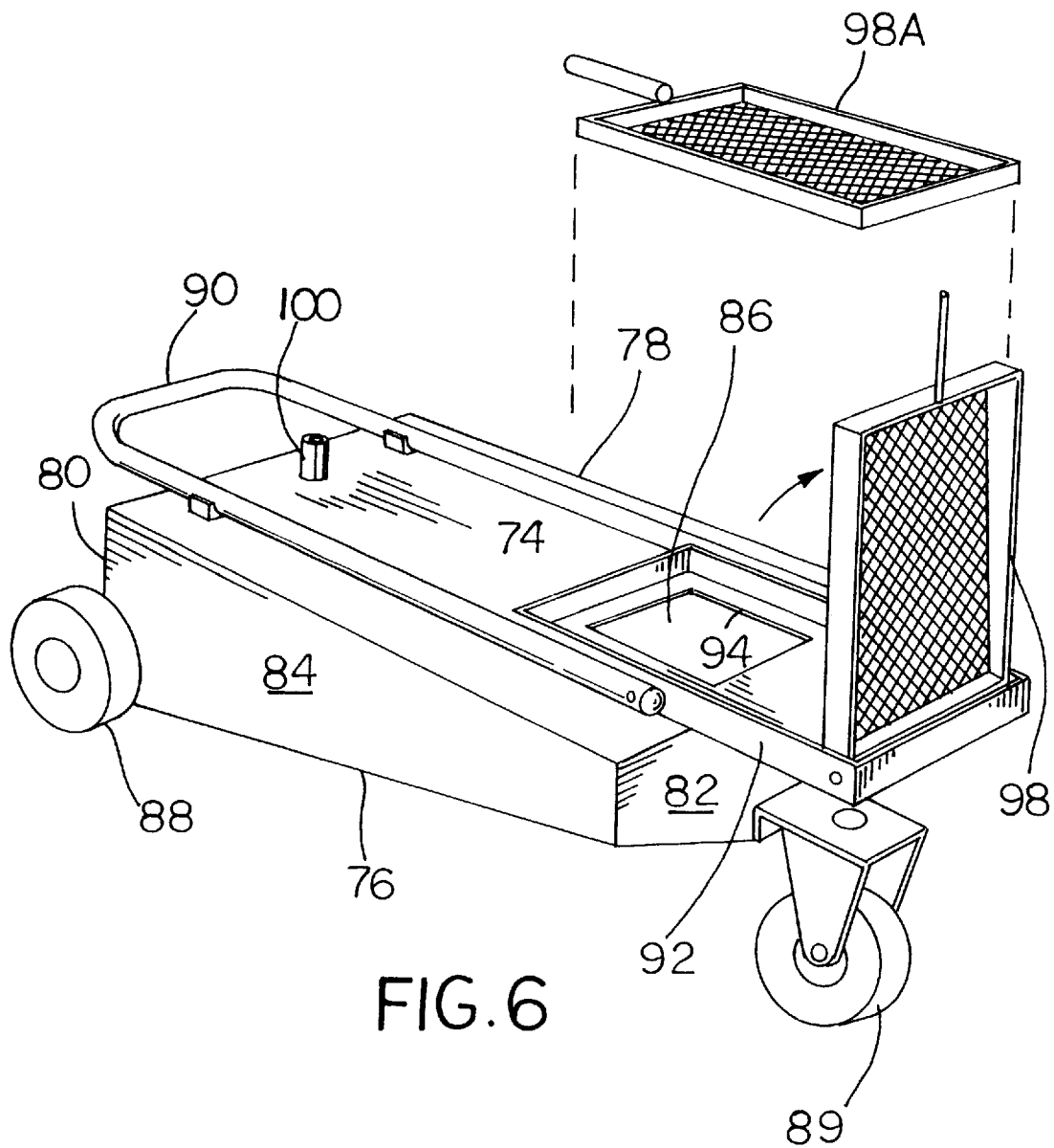
FIG. 6 is a perspective view similar to that shown in FIG. 5 illustrating the removal catch tray.

Referring now to FIGS. 5 through 8, collection cart 12 includes a top wall 74, a bottom wall 76, and a plurality of interconnecting sidewalls 78, 80, 82 and 84 defining an oil collection chamber 86 therebetween. Cart 12 is supported for movement by a pair of fixed wheels 88 and a pivoting wheel 89, and includes a handle 90 foldable between the folded position shown by the solid lines in FIGS. 5 or 7 and the extended position shown in FIGS. 1, 3 or 4. Cart 12 also includes a collection tray 92 having an inlet opening 94. Collection tray 92 extends over sidewall 82 past the edge of top wall 74, which permits the tray 92 to be positioned under the drain 94 of commercial fryer 96 shown in FIG. 4. A removable filter element 98 covers opening 94, and may be pivotally connected by a pivot 99 attached to tray 92. Alternatively, a removable filter element 98 which is detachable from the tray 92 may be used. Cart 12 also includes an transfer pipe 100 which is adapted to receive end 42 of conduit 40 described above for removing oil 27 from within cart 12. As shown in FIGS. 7 and 8, bottom wall 76 slopes towards a depression or pickup point 99 adjacent one of the sidewalls which facilitates easy removal of most of the oil collected within cart 12.

In operation, with the handle 90 in the extended position the operator (not shown) positions the tray 92 of cart 12 under the drain opening 94 of fryer 96. The drain 94 is opened as in known in the art so that the oil 27 contained therein is collected on tray 92 and flows into cart 12 through opening 94. Filter 98 removes most solids (not shown) such as french fries or chicken parts. Using handle 90, the operator then moves the cart 12 from the fryer 96 to a position adjacent the tank 10, and inserts end 42 of conduit 40 into the transfer pipe 100 located directly over the pickup point 99. The operator then activates the pump 34 using a conventional switch (not shown) in order to commence pumping the oil into tank 10 from cart 12 through conduit 40 until the cart 12 is empty. The timer 37 automatically shuts off the motor 36 after a predetermined time interval, preferably around four minutes, which is enough time to empty the cart 12. Thus, the operator cannot inadvertently leave the motor on and the service life of the motor and the pump is prolonged. When the level of oil 27 in chamber 26 reaches the level of float switch 62, float switch 62 generates a signal which activates the heating element 68, which serves to maintain the oil 27 in a liquid state. After a number of such transfers, the level of oil 27 in chamber 26 will eventually approach the level of float switch 64. When the level of float switch 64 is reached, switch 64 sends a signal to indicator light 70 on the exterior skin 28 of tank 10, which informs the operator that the tank 10 is reaching capacity. Shortly thereafter, the level of oil 27 in chamber 26 reaches the level of float switch 66. When the level of float switch 66 is reached, switch 66 sends a signal to indicator light 72, which informs the operator that the tank 10 is at capacity. At the same time, float switch 66 sends a signal to motor 36, which automatically shuts off the motor 36 and hence pump 34, so that the tank cannot be overfilled. The oil 27 in tank 10 can then be transferred to a disposal facility as is commonly practiced in the art by drawing the oil 27 out of tank 10 through output conduit 46.

It will be appreciated that the foregoing is presented by way of illustration only, and not by way of any limitation and that various alternatives and modifications may be made to the described embodiment without departing from the spirit and scope of the invention.

What is claimed:

1. An apparatus for collecting, storing, and transferring waste cooking oil, comprising:

a holding tank having a bottom wall, a top wall, and a plurality of interconnecting sidewalls, said top wall, said bottom wall, and said sidewalls defining an oil holding chamber;

an input conduit having a pair of ends, one of said input conduit ends being adapted for connection to a waste oil source for communication the waste oil from the waste oil source into said holding chamber;

an input pump in flow communication with said conduit for pumping the waste oil into said holding chamber, the other of said input conduit ends extending into said holding chamber;

an output conduit having a pair of ends, said output conduit for communicating the waste oil out of said holding chamber to a disposal facility;

a heating element for maintaining the waste oil in a liquid state while in said holding tank; and sensing means for sensing the level of oil in said chamber.

2. The device as claimed in claim 1, wherein said bottom wall includes a pick up point, said bottom wall being sloped towards said pickup point.

3. The device as claimed in claim 2, wherein one of said output conduit ends is disposed adjacent said pickup point, so that the waste oil can be transferred from said pickup point and out of said holding tank through the other of said output conduit ends.

4. The device as claimed in claim 1, wherein said holding tank includes a vent for venting pressure from said holding chamber.

5. The device as claimed in claim 4, wherein said vent is in said top wall.

6. The device as claimed in claim 1, wherein said holding tank includes an outer skin, and insulation disposed between said sidewalls and said outer skin.

7. The device as claimed in claim 1, including grinding means operatively connected to said pump for grinding solids suspended in the waste oil.

8. The device as claimed in claim 7, the pump including a housing, said grinding means being disposed within said pump housing.

9. The device as claimed in claim 1, wherein said pump includes an adjustable electronic timer for limiting the duration of the operation of said pump to a predetermined time interval.

10. The device as claimed in claim 1, wherein said sensing means is operatively connected to said heating element for activating said heating element when the level of oil in said holding chamber reaches a predetermined heating level.

11. The device as claimed in claim 1, wherein said sensing means includes indicator means for providing a visual indicator of the level of waste oil within said holding chamber.

12. The device as claimed in claim 1, wherein said sensing means includes a shut off switch electrically connected to said pump for shutting off said pump when the level of waste oil within said holding chamber reaches a predetermined shut off level.

13. The device as claimed in claim 1, wherein said sensing means includes at least one float switch, said float switch for generating an output signal in response to changes in the level of waste oil within said holding chamber.

14. An apparatus for collecting, storing, and transferring liquid waste cooking oil from a commercial fryer for storage and disposal, said apparatus comprising:

a holding tank having a bottom wall, a top wall, and a plurality of interconnecting sidewalls, said top wall, said bottom wall, and said sidewalls defining an oil holding chamber;

a waste oil receptacle adapted for receiving waste oil from the fryer, said receptacle being supported for movement over a support surface between the fryer and said tank;

an input conduit having a pair of ends, one of said input conduit ends being adapted for connection to said receptacle for communicating the waste oil from said receptacle into said holding chamber, the other of said input conduit ends extending into said holding chamber;

an input pump in flow communication with said input conduit for pumping the waste oil from said receptacle into said holding chamber;

an output conduit having a pair of ends, said output conduit for communicating the waste oil out of said holding chamber to a disposal facility; and a heating element for maintaining the waste oil in a liquid state while in said holding tank.

15. The apparatus of claim 14, including sensing means for sensing the level of waste oil in said holding chamber.

16. The apparatus of claim 15, wherein said sensing means includes activation means electrically connected to said heating element for activating said heating element when the level of waste oil within said holding chamber reaches a predetermined heating level.

17. The apparatus of claim 15, wherein said sensing means includes indicator means for providing a visual indicator of the level of waste oil within said holding chamber.

18. The apparatus of claim 15, wherein said sensing means includes a shut off switch electrically connected to said pump for shutting off said pump when the level of waste oil within said holding chamber reaches a predetermined shut off level.

19. The apparatus of claim 15, wherein said sensing means includes at least one float switch, said float switch for generating an output signal in response to changes in the level of waste oil within said holding chamber.

20. The apparatus of claim 14, wherein said receptacle includes a top wall, a bottom wall, and a plurality of sidewalls, said receptacle walls defining a chamber, said receptacle top wall including a oil entry opening for routing oil from the fryer to said chamber.

21. The apparatus of claim 20, wherein said top wall includes a filter element covering said entry opening for filtering solids from the oil.

22. The apparatus of claim 20, wherein said receptacle includes a plurality of wheels.

23. The apparatus of claim 20, wherein said receptacle bottom wall includes a depression, said receptacle bottom wall being sloped towards said depression.

24. The apparatus of claim 23, wherein said receptacle top wall includes a suction pipe, said suction pipe being disposed over said depression.

\* \* \* \* \*